(12) United States Patent
Lam

(10) Patent No.: US 7,251,723 B2
(45) Date of Patent: Jul. 31, 2007

(54) FAULT RESILIENT BOOTING FOR MULTIPROCESSOR SYSTEM USING APPLIANCE SERVER MANAGEMENT

(75) Inventor: Son H. Lam, Puyallup, WA (US)

(73) Assignee: Intel Corporation, Santa Clara, CA (US)

(*) Notice: Subject to any disclaimer, the term of this patent is extended or adjusted under 35 U.S.C. 154(b) by 1046 days.

(21) Appl. No.: 09/883,386

(22) Filed: Jun. 19, 2001

(65) Prior Publication Data
US 2003/0005275 A1 Jan. 2, 2003

(51) Int. Cl.
G06F 15/177 (2006.01)

(52) U.S. Cl. ............... 713/1; 713/2; 711/120; 711/145; 711/151; 710/112

(58) Field of Classification Search ........... 713/1, 713/2
See application file for complete search history.

(56) References Cited

U.S. PATENT DOCUMENTS

| | | | | |
|---|---|---|---|---|
| 4,377,000 A | * | 3/1983 | Staab | 714/55 |
| 4,639,856 A | * | 1/1987 | Hrustich et al. | 714/10 |
| 5,659,748 A | * | 8/1997 | Kennedy | 713/2 |
| 5,737,615 A | * | 4/1998 | Tetrick | 713/324 |
| 5,790,850 A | * | 8/1998 | Natu | 713/2 |
| 5,904,733 A | * | 5/1999 | Jayakumar | 713/2 |
| 6,009,521 A | * | 12/1999 | Huang | 713/1 |
| 6,108,781 A | * | 8/2000 | Jayakumar | 713/2 |
| 6,122,735 A | * | 9/2000 | Steiert et al. | 713/2 |
| 6,216,226 B1 | * | 4/2001 | Agha et al. | 713/2 |
| 6,496,881 B1 | * | 12/2002 | Green et al. | 710/58 |
| 6,601,165 B2 | * | 7/2003 | Morrison et al. | 713/2 |
| 6,611,911 B1 | * | 8/2003 | O'Shea et al. | 713/1 |
| 6,925,556 B2 | * | 8/2005 | Hill et al. | 713/2 |

* cited by examiner

Primary Examiner—A. Elamin
(74) Attorney, Agent, or Firm—Schwegman, Lundberg, Woessner & Kluth, P.A.

(57) ABSTRACT

A multiprocessor computer system implements fault resilient booting by using appliance server management. While previous systems have utilized fault resilient booting, it has required the use of a baseboard management controller chip. The present invention avoids the need for this chip by utilizing the appliance server management architecture. The testing of the processors and the determination of the bootstrap processor is controlled by the system I/O device utilizing a timer and a latch.

16 Claims, 2 Drawing Sheets

US 7,251,723 B2

FAULT RESILIENT BOOTING FOR MULTIPROCESSOR SYSTEM USING APPLIANCE SERVER MANAGEMENT

FIELD

The present invention is directed to a system for booting a multiprocessor computer system. More particularly, the present invention is directed to a system for booting a multiprocessor computer system using an appliance server management driver.

BACKGROUND

The use of fault resilient booting is known in the art and for example is described in U.S. Pat. No. 5,790,850. As described therein and as shown in FIG. 1, a multiprocessor system includes a number of processors 10-13 each of which include a local advance programmable interrupt controller (APIC) 14-17. The local APIC units are connected through an APIC 19 bus. An input/output APIC unit 28 is also connected to this bus. A processor bus 20 connects the processors and the memory.

In this system, when power is initially applied to the processors one of the processors is designated the bootstrap processor. One of the processors can be designated in the hardware for this function. The other processors are classified as application processors. Each of the processors undergoes a built in self test when power is initially applied. If the processor is faulty for any reason, it stores a status flag to indicate this. If the bootstrap processor is faulty, it is necessary to designate one of the application processors to handle the bootstrap function instead. U.S. Pat. No. 5,790,850 shows one method for doing this where application processors that have been tested to be good are successively examined. If all tests are passed, that application processor is designated as the bootstrap processor and that function is removed from the original bootstrap processor.

In systems of this type, the fault resilient booting is implemented in servers using the basic input output system (BIOS), the baseboard management controller (BMC) and other hardware to follow this procedure when the bootstrap processor fails. Most of this function is implemented in the baseboard management controller chip. However, the inclusion of this chip adds to the cost of the system. While this is not a problem for more expensive systems, in low cost servers, it is desirable to reduce the cost of the system.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
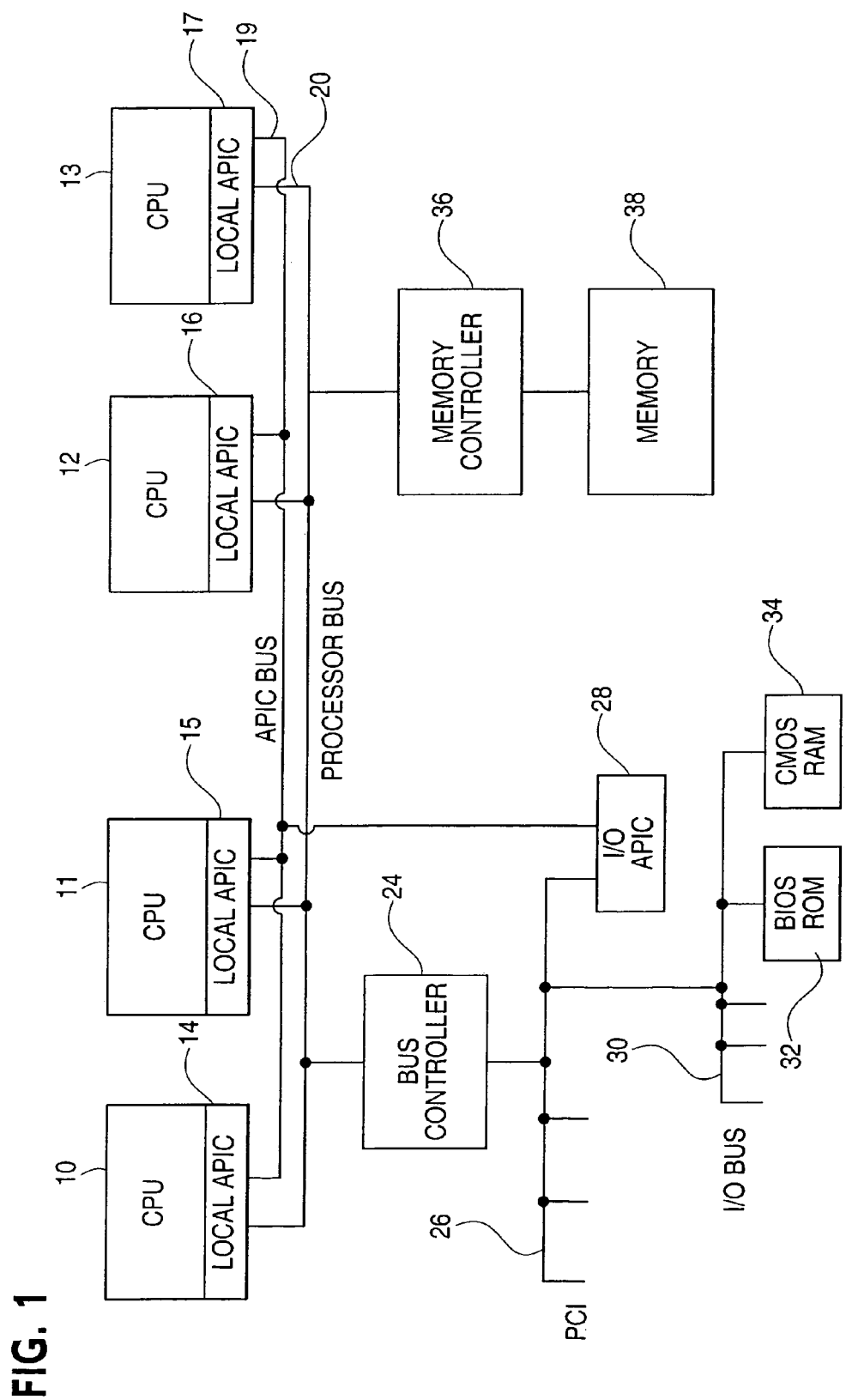
FIG. 1 is an example background arrangement useful in gaining a more thorough understanding and appreciation of the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. With regard to description of any timing signals, the terms assertion and negation may be used in an intended generic sense. More particularly, such terms are used to avoid confusion when working with a mixture of "active-low" and "active-high" signals, and to represent the fact that the invention is not limited to the illustrated/described signals, but could be implemented with a total/partial reversal of any of the "active-low" and "active-high" signals by a simple change in logic. More specifically, the terms "assert" or "assertion" indicate that a signal is active independent of whether that level is represented by a high or low voltage, while the terms "negate" or "negation" indicate that a signal is inactive. As a final note, well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

As shown in U.S. Pat. No. 5,790,850, a fault resilient booting scheme involving a plurality of processors can be accomplished by successively examining each application processor if the original bootstrap processor fails. FIG. 1 shows the overall arrangement of the processors and other major parts of such a system. Previously, the controls for the fault resilient booting process were stored in a baseboard management controller chip. The present invention avoids the necessity of having this chip by relying on an appliance server management arrangement so that the system can be provided at a lower cost.

The fault resilient booting processor includes at least three levels or parts that are controlled by timers at different stages of the basic input output system (BIOS) before the system is handed over to the operating system. The table below describes the different fault resilient booting levels and describes the time line by which they are executed.

| Reset de-asserted (BIST execution) | FRB-3 started |
|---|---|

-continued

| BIOS code execute | |
|---|---|
| Check built in self test result | FRB-1 |
| Power on self test start | FRB-2 started |
| | FRB-3 reset |
| Power on self test exit | FRB-2 reset |

This table describes the three levels of the fault resilient booting process which must be encountered before the system is handed over to the operating system for normal operations. The FRB-3 level refers to the portion of the process where a timer is started upon the power-up of the system or upon a hard reset. This timer must be stopped by BIOS. This requires the bootstrap processor to actually run BIOS code. If the timer is stopped this indicates that the bootstrap processor can actually run code and accordingly is not dead at this time. If the timer is not stopped, the bootstrap processor is disabled, the system is reset and another processor is assigned to become the bootstrap processor. When a new bootstrap processor is assigned, the APIC identification is changed so that the second processor is identified as the bootstrap processor. The BIOS running in the bootstrap processor is responsible for stopping the FRB-3 timer during a power on self test. This is accomplished by resetting the watchdog timer which is producing the timing signals.

The next level of the fault resilient booting, FRB-2, involves the use of the watchdog timer to backup the operation of the baseboard management controller during the power-on self test. BIOS sets a bit in the baseboard management controller to indicate that BIOS is in the FRB-2 phase. This bit is set after it is determined which processor is the bootstrap processor. BIOS then sets the FRB-2 bit, loads the watchdog timer with a new time-out interval and disables FRB-3. Using this process, there is no gap in the watchdog timer coverage between FRB-3 and FRB-2. If the FRB-2 phase is successful, BIOS disables the FRB-2 timeout prior to exiting the power on self test. The baseboard management controller provides commands for this purpose. This is generally done prior to initiating the option ROM scan.

If the timer expires during the FRB-2 function, the baseboard management controller generates a FRB-2 time-out message and hard resets the system. BIOS then determines that the previous boot attempt failed FRB-2 and examines the FRB-2 time out flag. BIOS then issues a disable processor command in order to disable the CPU that had failed the FRB-2 test.

The FRB-1 level is implemented by BIOS. If the bootstrap processor has failed, BIOS records the events so they can be logged later and disables the processor by sending a command to the baseboard management controller.

As can be seen in this description, the baseboard management controller is used to control this testing procedure using BIOS and the processors of the system. However, the inclusion of this chip causes additional cost for the system. It is desirable to eliminate this chip for less expensive systems. This can be accomplished with an appliance server management system.

The appliance server management system is an architecture utilizing arrangement of hardware, drivers, providers and software. This type of system can be implemented in a number of computers and includes a number of desirable features, including the ability to manage the system either locally or over the internet. It also allows the automatic alerting of an administrator when problems arise with the system. In regard to the present situation, it is possible to implement a fault resilient booting system using this management system. In doing so, it is possible to eliminate the baseboard management controller chip and instead use existing parts of the ASM system instead.

The following description helps to describe the difference in implementation using an ASM system rather than a BMC system. In the FRB-3 level the timer is in the BMC and is programmable or will assume a default time of ten seconds. This timer starts upon a power up or a hard reset. This timer must be stopped by BIOS by resetting the timer. If the timer expires, a signal is sent to the failed processor to indicate that it cannot act as the bootstrap processor and an internal message is generated indicating the failure. In this same level, the ASM system uses an on-board watchdog timer which is set to six seconds since BIOS operations are normally completed in less than five seconds. This timer is automatically started after the system resets. If the timer expires, it will set the CPU STOP Latch which sends a signal to disable the bootstrap processor.

In regard to the FRB-2 level, the BMC system uses the timer in the BMC while the ASM system uses a timer in the system I/O chip (SIO). In BMC, if the timer expires an event message is generated and the system is hard reset. BIOS then determines that the attempt has failed and sends a command to BMC to disable the failed processor. In ASM, when the timer expires, BIOS disables the bootstrap processor by setting a CPU STOP Latch by way of a general purpose I/O bit from the S1O chip.

In the FRB-1 level, in BIOS checks a processor built in self test (BIST) result. If the bootstrap processor fails, BIOS will assign this function to another processor. In ASM, if a built-in self test failure occurs, BIOS takes its own steps to record the event so that it can be logged later. BIOS disables the processor by setting the CPU STOP Latch by way of a general purpose I/O bit from the SIO chip. The latch can only be reset by another signal from the SIO chip. If BIOS is unable to set the CPU STOP Latch then the FRB-3 timeout is allowed to occur.

Figure 2:
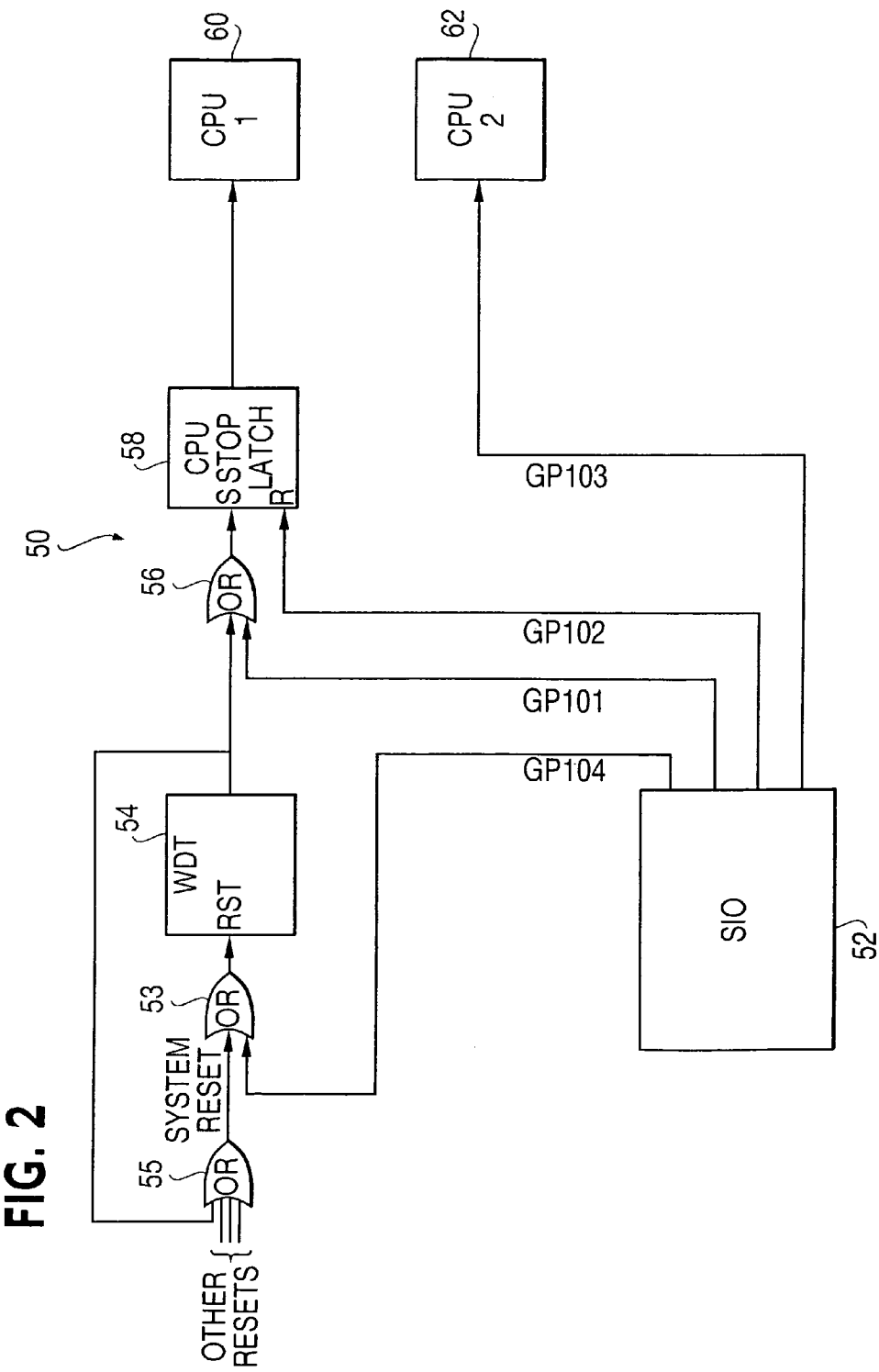
FIG. 2 is an example advantageous embodiment of the present invention.

FIG. 2 shows part of the hardware 50 utilized in the ASP system to control the fault resilient booting process. The system I/O chip (SIO) 52 provides many of the enabling signals for this process. Each of the outputs of this chip are labeled as general purpose I/O (GPIO) signals. This chip is programmed to follow the process and to provide the control signals based on the implementation described above.

The watchdog timer (WDT) 54 provides an output at six seconds so that this timer may be used for the FRB-3 test. When this signal is generated, the timer is considered to have expired and the signal is applied to OR gate 56 and then passed to the set input of CPU STOP Latch 58. This latch is set by the occurrence of this signal and the signal is then sent to disable CPU 60 which is the initial bootstrap processor.

The WDT produces an output signal after six seconds, as discussed above. The start of this six second period occurs due to the arrival of GPIO4 from the SIO or system reset which is applied to OR gate 53 which resets the timer. The SIO generates the signal due to the power being turned on or to a reset signal.

When the six second signal is sent to OR gate 56, it is also necessary to reset the system so that a second processor can be considered for the bootstrap operation. Accordingly, the six second signal also is branched off to OR gate 55 to cause a system reset. Other reset signals can be applied to OR gate 55 also. A second input (GPIO 4) to OR gate 53 can also reset the timer. The CPU 62 is an application processor which can be disabled through the S1O's GPIO 3.

The CPU STOP Latch 58, once set, can only be re-set by the receipt of a GPIO2 signal from the SIO at the reset input. Thus, this latch is not merely reset from a reset signal, but must be specifically opened by the SIO in view of the system condition.

In the FRB-2 level testing, the timer in the SIO chip is utilized to determine if the FRB-2 function has failed by the end of the timeout period. If the FRB-2 level test is failed, the signal GPIO 1 is generated and applied as an input to OR gate 56. It is then passed to the set position of the CPU STOP Latch which then turns off CPU 1 to prevent it from operating as the bootstrap processor.

Likewise, if the FRB-1 level test indicates a failure, the SIO generates GPIO1 signal which is passed to the CPU STOP Latch 58 to disable CPU 60.

Thus, it can be seen how this arrangement of hardware can produce the fault resilient booting process according to the ASM system using the test as described above. In so doing, the baseboard management controller chip is unnecessary and instead the ASM architecture is able to perform these tests under the control of; the SIO.

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

Further, the present invention may be practiced as a software invention, implemented in the form of a machine-readable medium having stored thereon at least one sequence of instructions that, when executed, causes a machine to effect the invention. With respect to the term "machine", such term should be construed broadly as encompassing all types of machines, e.g., a non-exhaustive listing including: computing machines, non-computing machines, communication machines, etc. Similarly, which respect to the term "machine-readable medium", such term should be construed as encompassing a broad spectrum of mediums, e.g., a non-exhaustive listing including: magnetic medium (floppy disks, hard disks, magnetic tape, etc.), optical medium (CD-ROMs, DVD-ROMs, etc), etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

The invention claimed is:

1. A method of fault resilient booting in a multiprocessor system, comprising:
   designating one processor as a bootstrap processor;
   providing a reset signal that starts a watchdog timer timing;
   testing the bootstrap processor to verify that it will run BIOS code;
   setting a latch for disabling said bootstrap processor if the testing indicates a failure to run BIOS code or if the watchdog timer times out;
   starting a control unit timer for providing a time limit for a power on self-test;
   testing during the power on self-test the operation of said bootstrap processor;
   testing during a built-in self-test the operation of said bootstrap processor;
   setting a latch for disabling said bootstrap processor if the control unit timer times out;
   assigning the bootstrap process to another processor if said bootstrap processor fails a test;
   said testing steps being implemented in an appliance server management system.

2. The method according to claim 1, wherein testing the bootstrap processor to verify that it will run BIOS code comprises using the watchdog timer to indicate a failure if the bootstrap processor is not reset within a predetermined time.

3. The method according to claim 2, wherein a failure in the second or third testing step also causes said latch to be set.

4. The method according to claim 1, wherein the testing steps are controlled by a control unit.

5. The method according to claim 4, wherein the control unit includes the system I/O chip.

6. An apparatus for fault resilient booting, comprising:
   a first processor designated as a bootstrap processor;
   a latch including a set input and a reset input, and including an output coupled to said bootstrap processor for turning off said bootstrap processor;
   a control unit including a timer coupled to the set input for providing a first control signal for setting said latch, the control unit including a second control signal coupled to the reset input for resetting said latch, and at least one additional control signal for controlling additional processors;
   a watchdog timer coupled to the set input for setting said latch, wherein the control unit includes a third control signal coupled to a reset input of the watchdog timer for resetting the watchdog timer.

7. The apparatus according to claim 6, further comprising the reset input of the watchdog timer coupled to the output of the watchdog timer through one or more logic gates.

8. The apparatus according to claim 7, wherein said watchdog timer begins a time period wherein power is turned on and ends said time period after a predetermined time.

9. The apparatus according to claim 8, wherein the bootstrap processor is considered to fail if said watchdog timer is not reset before reaching said predetermined time.

10. The apparatus according to claim 6, wherein said control unit includes a system I/O chip.

11. The apparatus according to claim 6, wherein the apparatus is part of an appliance server management system.

12. A multiprocessor system for fault resilient booting, comprising:
- a plurality of processors with one processor being designated a bootstrap processor;
- a control unit including a timer, the control unit operable for generating a plurality of control signals;
- a watchdog timer including a watchdog timer reset input coupled to a fourth of the plurality of control signals;
- a latch including a set input, a reset input, and a latch output, the set input coupled to an output of the watchdog timer and to a first of the plurality of control signals, the reset input coupled to a second of the plurality of control signals, and the latch output coupled to said bootstrap processor for turning said bootstrap processor off;
- said watchdog timer providing a signal indicating that a predetermined time has expired, which is applied to said latch to set said latch;
- said control unit providing the first control signal to said latch for setting said latch, the second control signal applied to said latch for resetting said latch, a third control signal for controlling other processors and the frist control signal for resetting the watchdog timer.

13. The system according to claim 12, wherein said first control signal from said control unit is generated when said bootstrap processor fails a power-on self-test or a built-in self-test.

14. The system according to claim 12, wherein said watchdog timer tests whether said bootstrap processor can run BIOS code.

15. The system according to claim 12, wherein the system is part of an appliance server management system.

16. A system according to claim 12, wherein said control unit causes another processor to become the bootstrap processor when said bootstrap processor is disabled by said latch.

* * * * *

UNITED STATES PATENT AND TRADEMARK OFFICE
CERTIFICATE OF CORRECTION

PATENT NO. : 7,251,723 B2
APPLICATION NO. : 09/883386
DATED : July 31, 2007
INVENTOR(S) : Lam It is certified that error appears in the above-identified patent and that said Letters Patent is hereby corrected as shown below:

In column 8, line 3, in Claim 12, delete "frist" and insert -- fourth --, therefor.

Signed and Sealed this

Twenty-third Day of October, 2007

JON W. DUDAS
*Director of the United States Patent and Trademark Office*